United States Patent
Hildebrand et al.

(10) Patent No.: US 6,227,285 B1
(45) Date of Patent: May 8, 2001

(54) HEAT STORAGE MEDIUM

(75) Inventors: Günter Hildebrand, Rehmsdorf; Michael Matthäi, Henstedt-Ulzburg; Norbert Matzat, Hamburg; Rolf Laudi, Bergteheide; Klaus Fieback; Wolfgang Ahrens, both of Berlin; Thomas Krämer, Adelsheim, all of (DE)

(73) Assignee: Schümann Sasol GmbH & Co. KG, Hamburg (DE)

( * ) Notice: Subject to any disclaimer, the term of this patent is extended or adjusted under 35 U.S.C. 154(b) by 0 days.

(21) Appl. No.: 08/880,016

(22) Filed: Jun. 20, 1997

Related U.S. Application Data

(63) Continuation of application No. 08/446,673, filed on May 26, 1995, now abandoned.

(30) Foreign Application Priority Data

| Dec. 2, 1992 | (DE) | 42 40 401 |
| Dec. 19, 1992 | (DE) | 42 43 202 |
| Mar. 6, 1993 | (DE) | 43 07 065 |

(51) Int. Cl.⁷ .................................................. F28D 17/00
(52) U.S. Cl. ............................... 165/10; 252/70; 585/9; 585/2
(58) Field of Search ................. 165/10, 104.14; 252/70, 32.7, 42.7; 585/2, 3, 4, 5, 9

(56) References Cited

U.S. PATENT DOCUMENTS

| 2,325,167 | * | 7/1943 | Vore | 585/9 X |
| 3,859,219 | * | 1/1975 | Hotten | 252/42.7 |
| 3,950,289 | * | 4/1976 | D'Amato et al. | 252/70 X |
| 4,253,983 | | 3/1981 | Blanie | 252/70 |
| 4,504,402 | * | 3/1985 | Chen et al. | 252/70 |
| 4,582,618 | * | 4/1986 | Davis | 252/32.7 |
| 4,711,813 | * | 12/1987 | Salyer | 252/70 X |
| 4,908,166 | * | 3/1990 | Salyer | 252/70 X |
| 5,053,446 | * | 10/1991 | Salyer | 252/70 X |

FOREIGN PATENT DOCUMENTS

| 1928694 | * | 5/1978 | (DE) | 252/70 |
| 2741829 | | 3/1979 | (DE) | |
| 2907366 | | 9/1980 | (DE) | |
| 236862 | | 6/1986 | (DE) | |
| 280113 | | 6/1990 | (DE) | |
| 0522259 | | 1/1993 | (EP) | |
| 4122659 | | 1/1993 | (DE) | |
| 2011607 | | 7/1979 | (GB) | |
| 0086981 | * | 7/1981 | (JP) | 252/70 |
| 0153077 | * | 9/1982 | (JP) | 252/70 |
| 0198779 | * | 12/1982 | (JP) | 252/70 |
| 0238382 | * | 11/1985 | (JP) | 252/70 |
| 2022884 | * | 1/1987 | (JP) | 252/70 |
| 3111483 | * | 5/1991 | (JP) | 252/70 |
| 4007390 | * | 1/1992 | (JP) | 252/70 |
| 4085387 | * | 3/1992 | (JP) | 252/70 |
| 4161478 | * | 6/1992 | (JP) | 252/70 |
| 4356582 | * | 12/1992 | (JP) | 252/70 |
| 1404516 | * | 6/1988 | (SU) | 252/70 |

* cited by examiner

*Primary Examiner*—Christopher Atkinson
(74) *Attorney, Agent, or Firm*—Martin A. Farber

(57) ABSTRACT

A heat storage medium such as paraffin for a latent heat accumulator (cold accumulator), which solidifies while forming crystal structures. In order to achieve improved responsiveness on heat input, the crystal structures are modified by a structure additive preferably in terms of hollow structures, such as e.g. hollow cones.

42 Claims, 3 Drawing Sheets

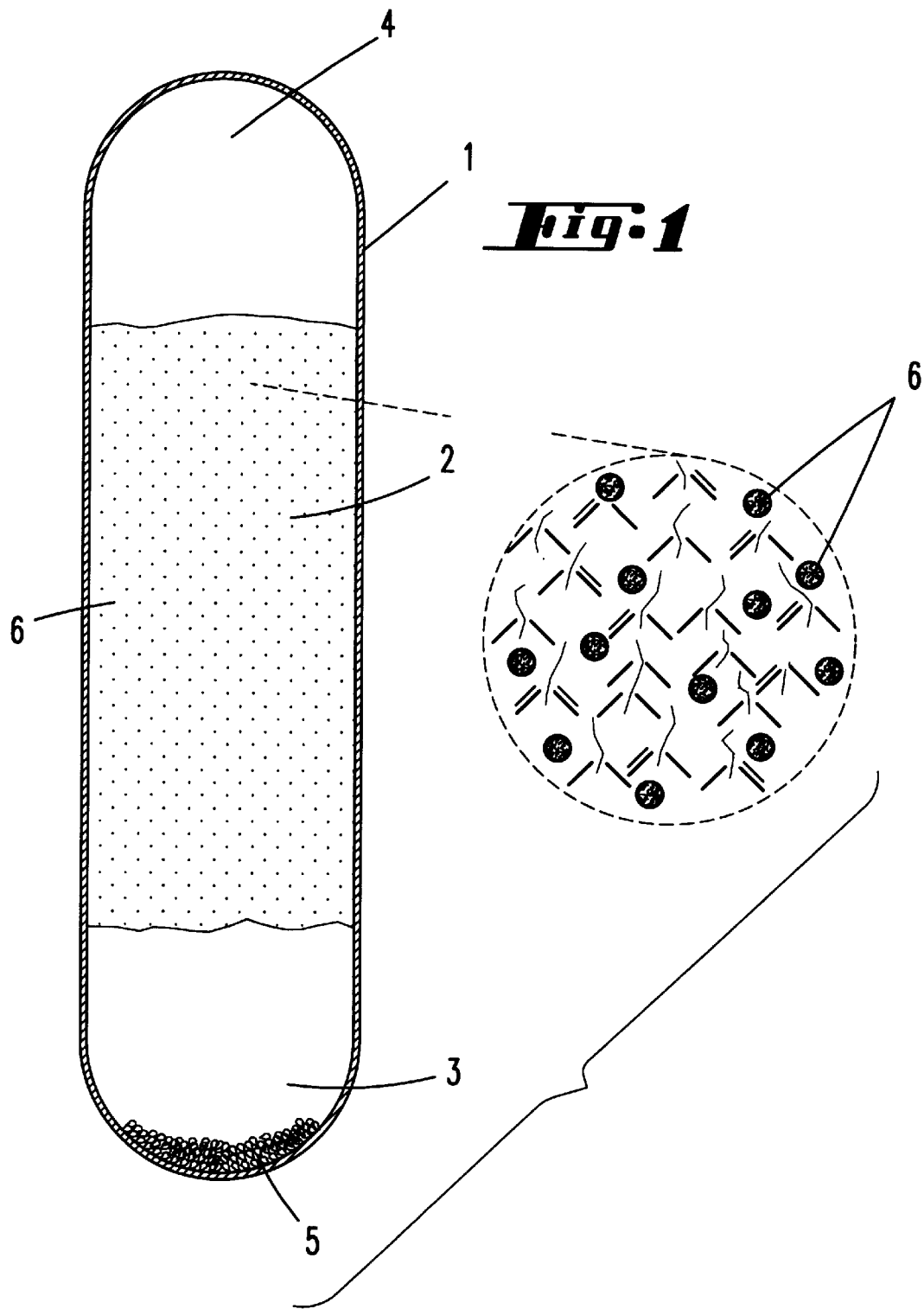

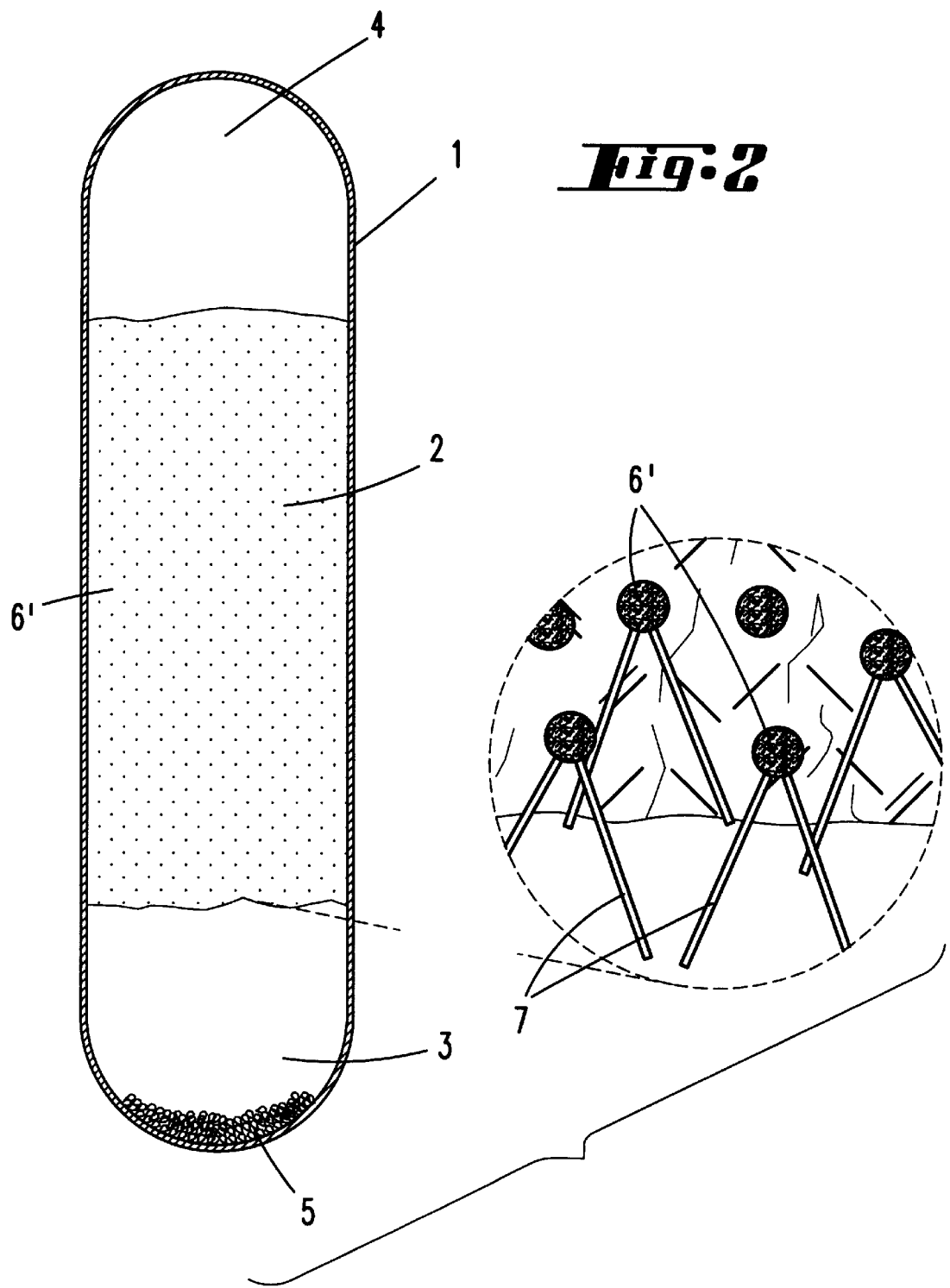

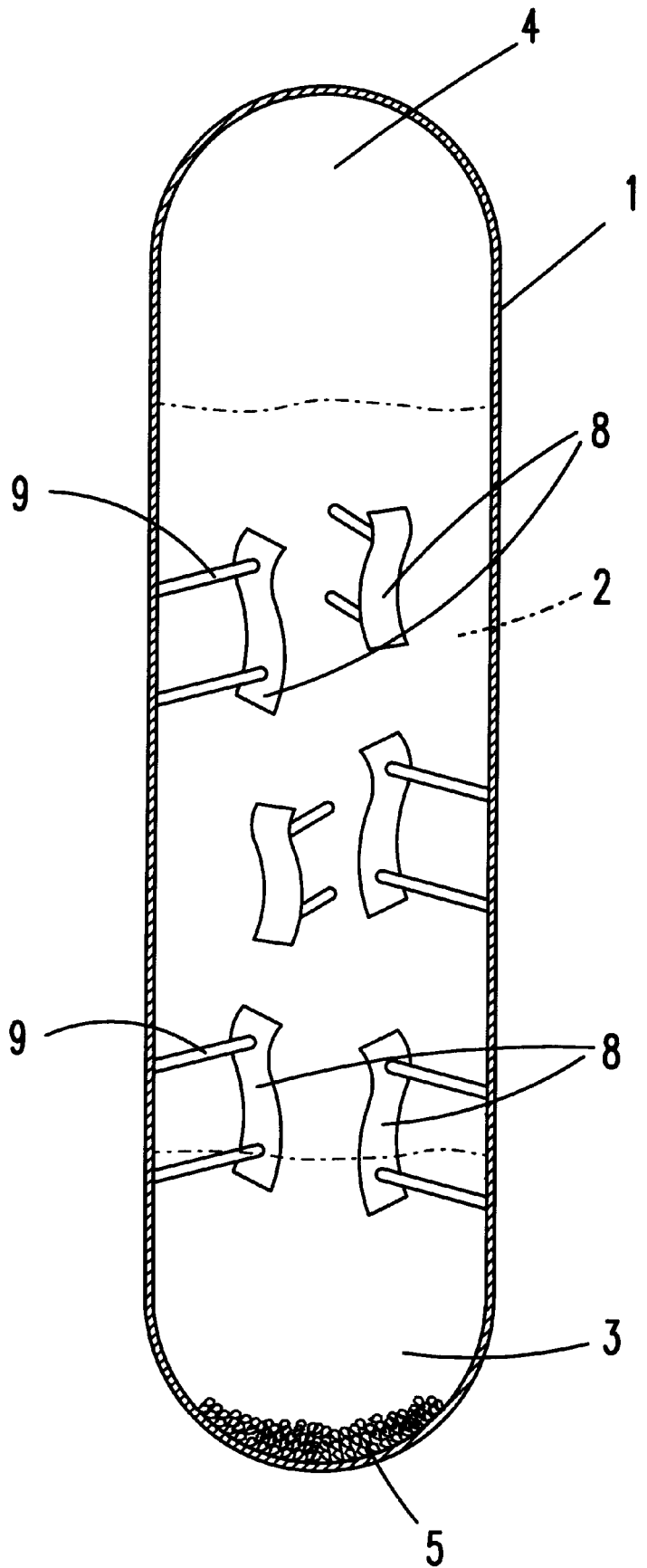

HEAT STORAGE MEDIUM

RELATED APPLICATION

This application is a continuation of our application Ser. No. 08/446,673 filed May 26, 1995 now abandoned.

FIELD AND BACKGROUND OF THE INVENTION

The invention refers in the first place to a heat storage medium for a latent heat accumulator or a latent cold accumulator, such as paraffin, which solidifies by forming crystal structures.

Latent heat accumulators are known to serve for effectivity-increasing temporal uncoupling of heat or cold generation and subsequent heat or cold consumption. Uncoupling permits long, continuous running times of heat or cold generators with high efficiencies and low start-up, shut-down and standstill costs. They are used, for instance, in plant for heat generation from solar energy or from fossil energy sources, but in addition also in cooling cycles.

Regarding prior art, reference is made e.g. to DE-A1 27 41 829. It is known therefrom to use for heat storage medium in a latent heat accumulator quantities of paraffin enclosed within a plastic envelope. Those plastic envelopes in turn are in an accumulator vessel filled with water. Heat transfer on such latent heat accumulators is merely by heat conduction through the plastic envelope to the paraffin. Such accumulators are referred to as static accumulators.

Furthermore, so-called dynamic latent heat accumulators are known, in which context reference is made e.g. to DD 23 68 62 and DD 28 01 13. As far as prior art is concerned, further reference should be made to DE-A1 41 22 659. In this connection, it is considered of disadvantage that the heat storage medium such as paraffin is only difficult to intersperse by the heat transfer medium, perhaps evaporating water or an alcohol-based liquid. This causes delays in response of the latent heat accumulator on heat input.

SUMMARY OF THE INVENTION

Starting from the state of the art last referred to, it is an objective of the invention to provide a heat storage medium such as paraffin for a latent heat accumulator (latent cold accumulator) which will specifically result in an improved response on heat input. Further, it is also to be borne in mind at this point that the heat storage medium should be compatible with environment.

This objective is attained by the object of claim 1, focussing on modifying the crystal structures by a structure additive, preferably in terms of hollow structures, such as hollow cones. The lamina shape of the crystals known for a paraffin-based heat storage medium from the state of the art will be changed accordingly to hollow cone-type or tubular crystal structures. The modified crystal structure is obtained by use of a crystal nuclei former disposed within the heat storage medium. According to the invention, it has been recognized that by direct modification of the crystal structures of the heat storage medium such as paraffin it is possible to improve decisively the response by the heat storage medium on heat input. Surprisingly, it has been shown that by such a crystal modification it can be achieved that the heat storage medium such as paraffin virtually adopts a porous structure. Water vapor, for instance, that forms on heat input not only penetrates the lower area of the heat storage medium but intersperses very rapidly the entire heat storage medium. It is nearly all of a sudden that thus a response results, i.e. melting of the heat storage medium and, hence, accumulation of heat. As far as previously and hereafter paraffin is mentioned in connection with the invention, that term is to cover paraffinic hydrocarbons such as n-paraffins (liquid) and macroparaffins. Also, it combines particularly so-called intermediate paraffins and microcrystalline waxes. In embodying the invention, it has been intended to have the structure additive homogeneously dissolved in the heat storage medium. In particular, there have been successfully used as structure additives especially those on the basis of polyalkylmethacylates (PAMA) and polyalkylacrylates (PAA), both as individual components and in combination. Their crystal-modifying effect is produced by the fact that the polymer molecules are built into the growing paraffin crystals and continued growth of this crystal shape is prevented. Due to the presence of the polymer molecules in the homogeneous solution in paraffin also in associated form, paraffins can grow up on the special associates. Hollow cones will be formed, which are no longer apt to form networks. Because of the synergistic action of that structure additive on the crystallization behavior of the paraffines, cavity formation and, thus, improved flowability through the heat storage medium paraffin (e.g. for water vapor) as compared to paraffins not so compounded is achieved.

In general, suitable as structure additives are also ethylene-vinylacetate copolymers (EVA), ethylen-propylene copolymers (OCP), diene-styrene copolymers, both as individual components and in mixtures, as well as alkylated naphthalins (Paraflow). The proportion of structure additives starts with a fraction of weight percent, realistically at approx. 0.01 percent by weight, and, in particular, up to a proportion of approx. 1 percent by weight shows considerable changes in terms of improvement. A higher dosage might be of disadvantage, since a great many small crystallites are formed, which will result in a dense crystal packing and, thus, adversely affect flowability through the heat storage medium. In particular, the proportion of structure additives depends also on the melting temperature of the heat storage medium. With higher-melting heat storage media or higher-melting paraffins, as a rule, a higher weight percentage of structure additives is required than with low-melting ones for achieving the same success. In further embodying the invention it is intended that the heat storage medium in the event of solid paraffinic hydrocarbons (macroparaffins, intermediate paraffins, microcrystalline waxes) contain liquid components (low-melting n- and isoalkanes as well as naphthenes), a so-called oil portion. As is well known, paraffinic hydrocarbons from vacuum distillate fractions are obtained by various technological separating steps requiring a certain oil portion. The heat storage medium can include an (uncracked) oil portion. It has been found to be of advantage in view of using a heat storage medium of the type hereunder described in more detail if the oil portion is adjusted to between. 0,1 and 10 percent by weight. When introducing in this embodiment heat to the heat storage medium in a solidified state, there results the effect that the oil portions included in uniform distribution will virtually exude from the heat storage medium and, by gravitation, run off downward. As compared to the said "porosity", this provides for still more enlarged paths within the heat storage medium, fostering in addition rapid penetration by the heat transfer medium. Such an oil portion in the heat storage medium, however, in most instances makes sense only if the heat storage medium has been solidified at room temperature. Furthermore, it is preferable within the scope of the invention to adjust the carbon chain lengths in the paraffin in a carefully directed manner, that is, to arrange for a specific distillation cut so selected that it is comparatively narrow. Narrow distillation cut means that only chain lengths of a few figures are comprised, e.g. C 14 through C 16 or C 20 through C 23. Since of course the distillation cut, at least for large-scale production where no very specific measures are taken, is always a result in terms of frequency distribution, the measure previously explained signifies that in any event by far the largest portion of a given quantity of heat storage medium is made up of the chain lengths comprising but a few figures. In particular, the distillation cut is determined by the melting temperature desired. In addition to that, it has been proved especially advantageous to prefer the even-numbered, normal C chains (n-alkanes). These have, in the isolation referred to, a surprisingly high heat storage capability on phase changes. At this point, it should be taken account of the fact that at least for big-scale production it is not always possible at reasonable cost to produce the C chains "pure" in terms of even numbers. In any event, it is advantageous to enrich them as far as possible. Another preferred embodiment of the invention provides for boiling bodies or formers of crystal nuclei having such a specific gravity that they are at least suspended in the heat storage medium. Since the heat storage medium, depending on its liquefied or solidified state, can have differing specific gravities, it is specifically preferred that those boiling bodies or formers of crystal nuclei are adapted to the specific gravity in the liquefied state. Once they are homogeneously distributed there, no segregation will result even on solidification, irrespective of whether or not different specific gravities prevail. This specific gravity can be obtained e.g. by plastic particles or foam glass parts. The boiling bodies or formers of crystal nuclei are preferably relatively small, within the millimeter or fractional range of millimeters, so that they can be very finely distributed in the heat storage medium. It is especially in combination with the above mentionned measure of modifying by a structure builder the crystal structure of the heat storage medium in terms of hollow structures that these bodies are found to be of advantage not only in terms of formers of crystal nuclei during the condensation process but also during boiling within the heat storage medium. The structure of the heat storage medium virtually adjusted porous will be interspersed, on heat input when using for heat transfer medium e.g. water, by water vapor which on the cooler heat storage medium at once recondenses. Steam that follows will again result in boiling processes which then, intensified by the bodies likewise arranged in the heat storage medium in a distributed fashion, will practically (re)occur uniformly and uniformly and immediately in the heat storage medium. The characterization that the boiling bodies or formers of crystal nuclei are present at least in suspension within the heat storage medium (because of their specific gravity) signifies that there can be provided also other (another group of such) bodies likewise designed as suspended matter within the heat storage medium. This is especially true where the heat transfer medium, e.g. alcohol, has a lower specific gravity than the heat storage medium. Regardless of this, it is preferred within the scope of the invention that also the heat transfer medium contains boiling bodies or formers of crystal nuclei (which normally, however, have therein only a function as boiling bodies. Where the heat transfer medium is water, those boiling bodies can be specifically heavier than water and will thus accumulate on the bottom of a corresponding latent heat accumulator (since in dynamic latent heat accumulators preferred for the purpose the lighter medium will normally settle on top of the heavier one). Designing the bodies also in the heat transfer medium in terms of suspended or nearly suspended substance, however, offers advantages, too, in that those bodies, if the heat transfer medium is specifically heavier than the heat storage medium, are hurled especially intensely into the heat storage medium, which further accelerates the desired melting process of the heat storage medium. Even though the function can be distinguished in view of creation of crystal nuclei and in view of suppressing a boiling delay, both effects are normally triggered by the same bodies, so that regarding material no distinction needs to be made. Such bodies are contained in the heat storage medium or the heat transfer medium preferably in the order of from 1 through 10 percent by weight. It goes without saying that even fractions of a percent by volume will produce a certain effect. Also, the boiling bodies or crystal nuclei formers can be so designed that based upon their specific gravity they are suspended partially in the heat transfer medium and partially in the heat storage medium. This can be achieved by a practicable design or in that—if e.g. the heat transfer medium (water) is specifically heavier than the heat storage medium (paraffin)—the boiling bodies or the crystal nuclei formers have a specific gravity between that of the heat storage medium and that of the heat transfer medium. Then, correspondingly, those bodies would arrange themselves on the boundary layer between the two media. This can be utilized to the effect that those bodies are designed with oblong stick- or tentacle-type extensions, by which they then project into the heat transfer medium, e.g. by an amount required for compensating their higher weight in relation of the heat storage medium. In this connection the design is preferably made in such a fashion that only the stick- or tentacle-type extensions project into the heat transfer medium. For the rest, the crystal nuclei formers/boiling bodies can be so selected by their specific weight that they are either in the heat storage medium (in suspension) or in the heat transfer medium only. In another preferred embodiment the filling medium is provided with an antifoam agent. Antifoam agents are basically known for paraffins oder similar media. Reference can be made in this connection to the pertinent literature. In view of a filling medium for a latent heat accumulator or latent cold accumulator, however, such an antifoam agent gets essential significance. Foam formation of the heat storage medium will result in locally poorer heat transfer figures on heat transfer surfaces and, hence, to reduced heat transfer yields. Further improvement can be achieved here by adding an antifoam agent to the heat storage medium. Antifoaming agents known are based e.g. on silicones, polyalkoxylates, fatty alcohol alkoxylates or carboxylic acid esters. In another embodiment provisions have also been made to the effect that the heat storage medium contains an antioxidant. This will prevent the heat storage medium from aging, e.g. by cracking the carbon chains. With regard to paraffins, antioxidants on the basis of polyalkylated phenols and nitrogen-substituted phenylene-diamins are known. Also in this respect reference is made to the literature relating to paraffins.

Another object of the invention is an additive for a heat storage medium crystallizing by forming crystal structures, such as paraffin, for a latent heat accumulator (latent cold accumulator), which additive includes a structure additive modifying the crystal structures in terms of hollow structures such as hollow cones. For more details regarding the structure additive, reference is made to what has been explained above. The additive can be added to existing heat storage media, especially on a paraffin basis, in order to improve their properties as described above in more detail.

Furthermore, the additive can contain boiling bodies, in particular such ones having different specific gravities, which are suitable, on the one hand, for being in suspension in the heat storage medium and, on the other hand, to be suspended in the heat transfer medium or to settle. In addition, the additive can also contain an antifoam agent and/or an antioxidant, for the individual components of which reference once again is made to the more detailed description above.

Another object of the invention is a latent heat accumulator or latent cold accumulator containing a heat storage medium of one of the embodiments previously described. In this connection, however, a specific design in view of the boiling bodies or crystal nuclei formers Is still preferred. This one proposes to provide the boiling bodies or crystal nuclei formers as fixed internals in the latent heat accumulator. In particular, the boiling bodies or crystal nuclei formers can be realized by sheet elements, preferably curved sheet elements. These elements have been suitably provided such that they project partially into the area of the heat transfer medium and partially into that of the heat storage medium.

Finally, an object of the application, too, is the use of paraffin with a certain oil portion, as previously described, for use in a heat storage medium for a latent heat accumulator.

BRIEF DESCRIPTION OF THE DRAWINGS

With the above and other advantages in view, the present invention will become ore clearly understood in connection with the detailed description of preferred embodiments, when considered with the accompanied drawings, of which:

FIG. 1 shows an hermetically sealed accumulator vessel with a magnifier-enlarged representation for a diagrammatical illustration of the enveloping structures and boiling bodies/crystal nuclei formers in the heat storage medium;

FIG. 2 is a representation according to FIG. 1, with modified boiling bodies/crystal nuclei formers; and FIG. 3 is a representation as per FIG. 1 or FIG. 2, showing fixed internals as boiling bodies or crystal nuclei formers.

DETAILED DESCRIPTION OF THE PREFERRED EMBODIMENTS

FIG. 1 illustrates an hermetically closed accumulator vessel consisting especially of a metallic material such as preferably aluminum. In the condition shown in the drawing the heat storage medium 2 is in a solidified state. That medium is solidified paraffin. In the bottom area of the latent heat accumulator there is substantially pure water 3 as heat transfer medium, whereas the top area 4 of the latent heat accumulator 1 exhibits a low-pressure air space or vacuum.

In the magnifier enlargement the crystal structure of the heat storage medium 2 is shown diagrammatically. What can be seen are hollow-cone type structures, which together result in the desired microporosity of the heat storage medium 2.

In the heat transfer medium 3, boiling bodies 5 are arranged, which on heat input effected e.g. by a not illustrated heat exchanger projecting into the latent heat accumulator 1 in the area of the heat transfer medium 3 or by simple heating of the latent heat accumulator 1 at its bottom provide for nearly simultaneous boiling of the water 3. Likewise, other boiling bodies 5 or crystal nuclei formers 6 are arranged in the heat storage medium 2. Because of their specific gravity, the crystal nuclei formers 6 are suspended in the heat storage medium 2 also if the latter is liquefied.

On heat Input to the latent heat accumulator 1 at its bottom area, the water 3 starts boiling at a certain temperature, which is essentially determined by the vacuum in space 4, and the steam emerging penetrates into the heat storage medium 2. Due to a structure additive homogeneously distributed in the heat storage medium 2, the latter, in its solidified state, is of a virtually porous nature, such that the steam can traverse a large surface nearly all of a sudden and, with corresponding suddenness, the heat storage medium 2 experiences a phase change and liquefies. So the steam passes rapidly to the top area 4, where usually, because of heat dissipation, condensation occurs. The water vapor collects in water drops and flows back to the bottom area of the latent heat accumulator 1. If more heat is extracted from the latent heat accumulator in its head area than is put into its bottom area, the latent heat accumulator discharges and below a certain temperature experiences another phase change (from liquid to solid), whereupon the condition shown in the drawing is reestablished.

FIG. 2 illustrates—essentially in diagrammatic representation—boiling bodies or crystal nuclei formers 6' exhibiting stick- or tentacle-type extensions 7. These can all be somewhat heavier than the crystal nuclei formers 6' proper speaking, which are here shown as balls. On the whole, the weight of such a body is specifically heavier than that of the heat storage medium 2, however, lighter than the weight of the heat transfer medium 3, so that the boiling bodies or crystal nuclei formers will float on the heat transfer medium 3 by utilizing buoyancy. From this explanation it will be evident also that the bodies 6', as far as they are composed e.g. by different materials, comprise also parts, e.g. the extensions 7, which consist of a material specifically heavier than the heat transfer medium 3, too.

It is further shown in FIG. 2 that in addition there exist in the latent heat accumulator 1 other boiling bodies 5 or crystal nuclei formers 6 of the form previously described with reference to FIG. 1.

There result fundamental effects yet from the extensions 7 in view of quick response of the latent heat accumulator 1. Along the extensions 7, especially if they have a good thermal conductivity, there can rapidly form channels of molten heat storage medium 2, through which the heat transfer medium can flow into other areas of the heat storage medium 2.

A comparable effect is also given in the embodiment represented in FIG. 3, at least as far as the fixed internals 8 provided there project into both the heat transfer medium 3 and the heat storage medium 2. The fixed internals are retained on the accumulator vessel e.g. by holding devices 9.

It is indicated that the fixed internals 8 are preferably curved faces. There are many other designs of the curved faces imaginable.

What is claimed is:

1. A heat storage medium which solidifies by forming crystal structures, for a latent heat accumulator wherein the crystal structures are modified by a structure additive comprising crystal nuclei formers leaving hollow structures within the storage medium, wherein the heat storage medium is a phase change material suitable for use in a latent heat accumulator, the heat storage medium being capable of being interspersed for heat transfer by a heat transfer medium penetrating within the hollow structures, the additive being homogeneously distributed within the heat storage medium with a weight concentration of less than approximately one percent.

2. A heat storage medium according to claim 1 wherein the structure additive in the heat storage medium is homogeneously dissolved.

3. A heat storage medium according to claim 1, wherein the heat storage medium comprises paraffin, and the structure additive belongs to the family of polyalkyl(meth) acrylates.

4. A heat storage medium according to claim 1, wherein the structure additive is added to the heat storage medium at between 0.01 and 1 percent by weight.

5. A heat storage medium according to claim 1, wherein the heat storage medium includes an oil portion.

6. A heat storage medium according to claim 5, wherein the oil portion is between 0.1 and 10 percent by weight.

7. A heat storage medium according to claim 1, wherein the heat storage medium includes paraffinic hydrocarbons of a narrow distillation cut.

8. A heat storage medium according to claim 7, wherein even-numbered, normal C chains n-alcanes are provided.

9. A heat storage medium according to claim 1, further comprising boiling bodies wherein the boiling bodies or crystal nuclei formers have a specific gravity such that they are suspended in the heat storage medium.

10. A heat storage medium according to claim 1 further comprising boiling bodies, wherein the boiling bodies and the crystal nuclei formers have different specific gravity.

11. A heat storage medium according to claim 1, further comprising boiling bodies, wherein boiling bodies and the crystal nuclei formers are at a proportion of 0.01 through 1.0 percent by weight.

12. A heat storage medium according to claim 1, further comprising boiling bodies constituting glass bodies, foam glass bodies, or plastic bodies.

13. A heat storage medium operative with a heat transfer medium according to claim 1, further comprising boiling bodies, the boiling bodies, and the crystal nuclei formers having a specific gravity such that they are suspended partly in the heat transfer medium and partly in the heat storage medium.

14. A heat storage medium according to claim 1, further comprising boiling bodies the boiling bodies and the crystal nuclei formers having stick-type extensions.

15. A heat storage medium operative with a heat transfer medium according to claim 14, wherein only the stick-type extensions project from the heat storage medium into the heat transfer medium.

16. A heat storage medium according to claim 1, further comprising an antifoam agent at a proportion of 0.01 through 5 percent by weight.

17. A heat storage medium according to claim 16, wherein the antifoam agent consists of a material on the basis of silicones, polyalkoxylates, fatty acid alkoxylates or carboxylic acid esters.

18. A heat storage medium according to claim 1, further comprising an antioxidant at a proportion of 0.001 through 0.1 percent by weight.

19. An additive for a heat storage medium which solidifies by forming crystal structures, for a latent heat accumulator comprising a structure additive comprising crystal nuclei formers modifying the crystal structures of the heat storage medium by formation of hollow structures, wherein the heat storage medium is a phase change material suitable for use in a latent heat accumulator, the heat storage medium being capable of being interspersed for heat transfer by a heat transfer medium penetrating within the hollow structures, the additive being homogeneously distributed within the heat storage medium with a weight concentration of less than approximately one percent.

20. A heat storage medium according to claim 19, wherein the structure additive belongs to the family of polyalkyl (meth)acrylates.

21. An additive according to claim 19, further comprising boiling bodies, wherein the boiling bodies or the crystal nuclei formers have a specific gravity such that they are suspended in the heat storage medium.

22. An additive according to claim 19, further comprising boiling bodies, the bodies and the crystal nuclei formers being of different specific gravity.

23. An additive according to claim 19, further comprising boiling bodies, boiling bodies or the crystal nuclei formers constituting glass bodies, foam glass bodies, or plastic bodies.

24. An additive according to claim 19, further comprising an antifoam agent.

25. An additive according to claim 24, wherein the antifoam agent consists of a material on the basis of silicones, polyalkoxylates, fatty alcohol alkoxylates or carboxylic acid esters.

26. An additive according to claim 19, further comprising an antioxidant.

27. A latent heat accumulator comprising a heat storage medium which solidifies by forming crystal structures, for a latent heat accumulator wherein the crystal structures are modified by a structure additive comprising crystal nuclei formers leaving hollow structures within the storage medium; and the heat storage medium is a phase change material suitable for use in the latent heat accumulator, the heat storage medium being interspersed for heat transfer by a heat transfer medium of the latent heat accumulator, the additive being homogeneously distributed within the heat storage medium with a weight concentration of less than approximately one percent to provide porosity to the heat storage medium.

28. A latent heat accumulator according to claim 27, further comprising an accumulator vessel, and wherein boiling bodies are provided as fixed internal elements in the accumulator vessel.

29. A latent accumulator according to claim 28, wherein the fixed internal elements have curved surfaces.

30. The use for heat storage medium for a latent heat accumulator of a medium which solidifies by forming crystal structures, wherein the crystal structures are modified by a structure additive comprising crystal nuclei formers leaving hollow structures within the storage medium, the heat storage medium comprising an oil portion, wherein the heat storage medium is a phase change material suitable for use in the latent heat accumulator, the heat storage medium being capable of being interspersed for heat transfer by a heat transfer medium, the additive being homogeneously distributed within the heat storage medium with a weight concentration of less than approximately one percent to provide porosity to the heat storage medium.

31. The use according to claim 30, wherein the oil portion amounts to between 0.1 and 10 percent by weight.

32. The heat storage medium according to claim 1, wherein the hollow structures are hollow cones.

33. The additive according to claim 19, wherein the hollow structures are hollow cones.

34. The heat storage medium according to claim 1, wherein the storage medium is paraffin.

35. The additive according to claim 19, wherein the storage medium is paraffin.

36. A heat storage medium which solidifies by forming crystal structures, for a latent heat accumulator wherein the crystal structures are modified by a structure additive leaving hollow structures within the storage medium;

wherein the heat storage medium is a phase change material having states of solid and liquid; and wherein the crystal structure additive is soluble within the heat storage medium and uniformly dispersed within the heat storage medium with a weight concentration of less than approximately one percent to provide porosity to the heat storage medium.

37. A heat storage medium according to claim 36 wherein said structure additive comprises polymeric material.

38. A heat storage medium according to claim 37 wherein the heat storage medium comprises paraffin.

39. A heat storage medium according to claim 38, wherein the paraffin is a narrow cut in the range of 14–16 carbon atoms or 20–23 carbon atoms.

40. A heat storage medium according to claim 36 wherein the structure additive comprises one or more of the polymers PAMA, PAA, EVA, OCP, diene-styrene copolymers, and alkylated naphthalins.

41. A heat storage medium according to claim 36, wherein the heat storage medium has a porosity from said hollow structures allowing propagation of water vapor.

42. A heat storage medium which solidifies by forming crystal structures, for a latent heat accumulator wherein the crystal structures are modified by a structure additive leaving hollow structures within the storage medium;
wherein the heat storage medium is a phase change material having states of solid and liquid;
crystal nuclei formers are dispersed homogeneously in the heat storage medium with a weight concentration of less than approximately one percent to provide porosity to the heat storage medium, the crystal nuclei formers having dimensions less than approximately one millimeter for homogeneous dispersion within the heat storage medium; and
each of said crystal nuclei formers has a specific gravity comparable to the specific gravity of the heat storage medium in its liquid state to enable suspension of the crystal nuclei formers in the heat storage medium.

\* \* \* \* \*